United States Patent
Hoche

(10) Patent No.: US 10,260,911 B2
(45) Date of Patent: Apr. 16, 2019

(54) METHOD FOR INTRODUCING A STRUCTURE INTO AN ELEMENT, IN PARTICULAR AN ELEMENT OF AN ANGLE MEASURING SYSTEM

(71) Applicant: Randolf Karl Hoche, Garching (DE)

(72) Inventor: Randolf Karl Hoche, Garching (DE)

( * ) Notice: Subject to any disclaimer, the term of this patent is extended or adjusted under 35 U.S.C. 154(b) by 179 days.

(21) Appl. No.: 14/773,535

(22) PCT Filed: Mar. 8, 2014

(86) PCT No.: PCT/IB2014/059549
§ 371 (c)(1),
(2) Date: Sep. 8, 2015

(87) PCT Pub. No.: WO2014/141025
PCT Pub. Date: Sep. 18, 2014

(65) Prior Publication Data
US 2016/0178405 A1   Jun. 23, 2016

(30) Foreign Application Priority Data
Mar. 10, 2013 (DE) .................... 10 2013 004 156

(51) Int. Cl.
*G01D 5/347* (2006.01)
*B23K 26/362* (2014.01)
*B23K 26/361* (2014.01)

(52) U.S. Cl.
CPC ....... *G01D 5/34707* (2013.01); *B23K 26/361* (2015.10); *B23K 26/362* (2013.01)

(58) Field of Classification Search
CPC .... B23K 26/03; B23K 26/04; B23K 26/0823; B23K 26/362; G01D 5/34707
See application file for complete search history.

(56) References Cited

U.S. PATENT DOCUMENTS

| | | | | |
|---|---|---|---|---|
| 4,406,939 A | * | 9/1983 | Golker | B23K 26/04 219/121.68 |
| 4,759,073 A | * | 7/1988 | Shah | G05B 19/4083 228/103 |

FOREIGN PATENT DOCUMENTS

| | | |
|---|---|---|
| DE | 10019499 A1 | 10/2001 |
| EP | 0048487 A1 | 2/1982 |
| EP | 1903316 A1 | 3/2008 |

OTHER PUBLICATIONS

International Preliminary Report on Patentability (dated Mar. 10, 2013) for corresponding International Application PCT/IB2014/059549.
International Search Report (dated Jul. 2, 2014) for corresponding International Application PCT/IB2014/059549.
International Preliminary Examination Report (dated Jun. 22, 2015) for corresponding International Application PCT/IB2014/059549.

\* cited by examiner

*Primary Examiner* — Thanh Luu
(74) *Attorney, Agent, or Firm* — WRB-IP LLP

(57) ABSTRACT

In a method for applying a structure such as a marking and/or inscription to at least one element with a marking system, such as a laser system, the at least one element is arranged relative to a shaft, the method including:
a) arranging the shaft or the shaft with the element arranged relative to the shaft in the marking system;
b) determining a spatial position and/or a centre of rotation of the shaft in relation to a reference point, preferably the origin, of the marking system; and
c) applying a structure to the element.

19 Claims, 3 Drawing Sheets

METHOD FOR INTRODUCING A STRUCTURE INTO AN ELEMENT, IN PARTICULAR AN ELEMENT OF AN ANGLE MEASURING SYSTEM

BACKGROUND AND SUMMARY

The present invention relates to a method for applying a structure, in particular a marking or inscription, to at least one element by meats of a marking, system, and to a method for producing an angle measurement system or a component of an angle measurement system, and to an angle measurement system or component of an angle measurement system produced by means of this method.

It is particularly the case in angle measurement systems that the scales used for determining the angle must be applied with a high degree of precision. A inscription method is known from the prior art, in particular from DE 100 19 499, in which a signal carrier is attached in an inscription device having a rotational axis and the signal carrier is rotated about the rotational axis. An eccentricity of the centre of the signal carrier relative to the rotational axis is detected and the corrected value is taken into account when applying the marking.

It is likewise known from the prior art, e.g. DE 10 2005 021 504 to adjust the body, to be provided with a marking, on a support device of the inscription system, wherein the adjustment takes place via the mutual alignment of markings on the body and the support device.

However, a disadvantage of the known methods is that although the eccentricity of the signal carrier or of the element to be provided with the inscription relative to the reference axis of the inscription system is taken into account, the element is mounted on the angle measurement system after inscription, which system can likewise have manufacturing tolerances or unbalances. This leads, in turn, to an inaccuracy during distance or angle measurement since the manufacturing tolerances or even the dynamic imbalance of the bearing of the angle measurement system itself have not been taken into account.

In order to counteract these problems, the angle measurement systems themselves must be manufactured with an extremely high degree of precision, which is very expensive and complex.

It is desirable to provide a simplified method for producing a structure on an element, in particular on an element for an angle measurement system which allows precise measurements.

A method for producing a structure, a method for producing an angle measurement system or component of an angle measurement, and an angle measurement system or a component of an angle measurement system are provided.

The term "component" is understood to mean a single-piece or multi-piece component.

In accordance with the invention, a method for applying a structure, in particular a marking and/or inscription, to at least one element with a marking system, in particular a laser system is provided, wherein the at least one element is arranged relative to a shaft. The invention is based on the idea of arranging, in a first step a), the shaft, onto which the element will subsequently be arranged or attached, and/or the shaft together with the element arranged relative to the shaft, in the marking system. In a second step b), a spatial position and/or a centre of rotation of the shaft in relation to a reference point, preferably an origin, of the marking system is/are determined and then in step c) a structure is applied to the element arranged relative to the shaft. As a result, it is not the eccentricity of the element itself which is determined, as in the prior art, but the spatial position of the shaft, preferably its centre of rotation, relative to which the element is to be arranged, and therefore manufacturing inaccuracies are reduced and dynamic imbalances of the shaft bearing are also taken into account. Additionally, since the element is already at its assembly position whilst the structure is applied, the production of the angle measurement system can thus be significantly simplified.

In accordance to a further advantageous embodiment of the inventive method, the structure is applied taking into account the determination of the spatial position and/or the centre of rotation of the shaft. This means that, in contrast to the prior art, in which an eccentricity of the element is decisive for the correction values when applying the structure, this eccentricity of the element is not taken into account at all in the inventive method when applying the structure and only the spatial position or centre of rotation of the shaft is of interest. This is particularly possible since the element does not have to be arranged on another shaft, but remains on the measured shaft.

In accordance to a further advantageous embodiment, the shaft and/or the shaft with the element arranged relative to the shaft remains in the marking system during all steps following step a). In an advantageous manner, the precision can be further increased since imperfection sources due to dismounting the shaft from the marking system are avoided. At the same time, the method can be simplified since the spatial position of the shaft does not have to be measured again.

In accordance to a further advantageous embodiment, a measuring body is used, in particular for determining the relation of the spatial position and/or centre of rotation of the shaft to a reference point of the marking system, wherein the measuring body is preferably placed on the shaft in a form-fitting manner. By means of this inventive measuring body, the spatial position or centre of rotation of the shaft relative to a reference point of the marking system can be uniquely determined. Thereby, the measuring body can be formed as an active and/or passive measuring body. Exemplarily, a sensor providing signals may be considered, as an active measuring body, wherein the signals may be used to (actively) determine the spatial position of the shaft, and wherein the active measuring body transmits the measured signals, for example, to the marking system directly and/or even to a control system which in turn is connected to the marking system.

Alternatively or additionally, a passive measuring body can also be used which is preferably pre-measured by means of the marking system, whereby in turn the spatial position or centre of rotation of the shaft can be determined. To this end, a marking can be applied onto the measuring body for example, which marking is detected by means of the marking system. Depending upon where the marking is located, the marking system may then determine the spatial position or centre of rotation of the shaft. Such a marking can be previously applied to the measuring body but it is also possible to apply, and then measure, this marking by means of the marking system.

However, at the same time it is also possible to determine the spatial position or centre of rotation of the shaft merely from the geometric shape of the measuring body.

The measuring body itself, in whatever design, advantageously permits a simple and rapid determination of the spatial position or centre of rotation of the shaft, and therefore the method is in turn simplified.

If a measuring marking, is applied on the measuring body, then it is particularly advantageous if the marking system, which preferably comprises at least one suitable radiation source for determining the spatial position and/or centre of rotation of the shaft, irradiates the measuring marking, wherein preferably the measuring marking is formed such that, upon irradiation with the radiation source the measuring marking shows a different reflection behaviour at the at least one structured location than at an unstructured location. Since a radiation source is typically already provided on a marking system, a measuring marking formed in this manner can be used to determine the spatial position or centre of rotation of the shaft in a particularly simple manner.

In accordance to a further advantageous embodiment, the measuring body is removed from the shaft, prior to applying the structure. Thereby, it can be ensured that the shaft remains in the marking system whilst only the measuring body is removed.

A further advantageous step of the inventive method comprises the rotation of the shaft for determining the spatial position and/or centre of rotation of the shaft. The spatial position of the shaft itself or the centre of rotation thereof can be measured before and/or after and/or even during this rotation, or a measuring body placed on the shaft can, as described above, assist to uniquely determine the spatial position of the shaft or the centre of rotation thereof. Of course, instead of the shaft, the device can also be rotated about the shaft, wherein in this case preferably the measuring body is placed on the device.

In accordance with a further advantageous embodiment, a lower energy density of the marking system is applied for the step of determining the centre of rotation and/or the spatial position of the shall than for the step of applying the structure. It is particularly preferred if the marking system is formed as a laser system. As already described above, the marking system can also be designed to scan a measuring marking applied to a measuring body. However, in order to do this without causing damage, it is advantageous to set the energy density of the marking system such that no structural damage or effects occur on the measuring body. It is particularly preferred if the energy density is below the marking threshold of the material used. This means, for example, that when using a laser, the laser can be actuated or used at a first energy density which has no effect on the material of the measuring body and/or on the element provided with a structure, and which is merely used to determine the spatial position or centre of rotation of the shaft. In contrast to that, a second energy density is adapted so that a structure can be applied to the element. Such a structure is mostly permanent, since in the region of the structure the material properties of the element are changed due to the energy density applied by the radiation source, in particular by the laser.

In accordance with a further advantageous embodiment, the inventive method comprises the step of attaching the element to the shaft or to a device including the shaft, wherein the step of attaching the element occurs before step a). i.e. the step of arranging the shaft in the marking system, or before step c), namely applying the structure. Again, the shaft preferably remains in the marking, system, and therefore an imperfection is not implemented due to the dismounting of the shaft from the marking system. Alternatively, in order to attach the element to the shaft, the shaft may once more be removed from the marking system.

It can be further advantageous to once again perform the step of determining the spatial position. Since the structure is only applied to the element when the element is attached to the shaft or is arranged relative to the shaft, it is irrelevant whether the eccentricity of the element has been determined. The decisive factor for avoiding imperfections in the inventive method is the measuring of the spatial position of the shaft, to/on which the element is attached or arranged.

In accordance with a further advantageous embodiment, the inventive method may be used not only to provide a single element with a structure but also to provide a plurality of elements, to be arranged relative to the shaft, with a structure by means of the method. Thereby, for any further element, only the attaching step and the step of applying the structure are performed. As a result, the method can again be simplified and accelerated.

Preferably, only after having applied all the structures to all the elements to be arranged relative to the shaft, the shaft, together with the elements arranged thereon, is removed from the marking system. As a result, the spatial position of the shaft only has to be measured only once, whereby the marking method can be performed considerably more quickly and more precisely. In addition, the inventive method may be used to produce highly-precise structures on mutually rotatable elements which are aligned precisely with one another, since no further imperfections may occur due to only subsequently mounting the finished structured elements on a shaft. In addition, after applying the last structure to the last element, a finished structured element, in particular a finished mounted component for an angle measurement system, may be removed from the marking system preferably together with the device in which it was installed.

As already indicated above, it is particularly preferred to use the method to produce an angle measurement system or a component for an angle measurement system. Therefore, a further aspect of the present invention relates to a method for producing an angle measurement system or a component thereof, wherein the angle measurement system or the component comprises at least one element having a preferably optically effective structure, wherein the structure is applied to the element in accordance with the above-described method.

Angle measurement systems are available in a wide variety of designs and typically include a first element having a first structure and a second element which can be rotated with respect to the first element and has a second structure. Furthermore, at least one radiation source may be provided which emits radiation to the first element with the preferably optically effective structure, formed as a measuring structure, and along the radiation path to an optically effective reference structure, i.e. a second element. Diffraction grating structures may frequently be used as the optically effective structures. Since the radiation of the radiation source is modulated via the optically effective structure of the measuring structure and the optically effective structure of the reference structure depending upon the spatial position of the structures with respect to each other, this modulation can be used to determine the relative position of the two optical structures with respect to each other. However, thereby, the optically effective structures of the measuring structure and of the reference element have to be precisely aligned with respect to each other. At the same time, the optically effective structures have to be be formed extremely finely in order to be able to provide a sufficiently high resolution. Imprecise alignment of the structures with respect to each other, which can occur for example due to manufacturing inaccuracies and dynamic imbalances of the shaft bearing, can lead to angle errors or to an angle-dependent amplitude of the measuring signal and, on the basis thereof, to the problem of the measuring signal possibly disappearing.

The inventive method for applying a structure to an element may be used to solve this problem since the structure is applied to the element arranged relative to the shaft not relative to a positioned element but relative to the positioned shaft, preferably to the positioned centre of rotation of the shaft. As a result, imperfections which occur from a lack of adjustment or simply imprecise adjustment of the elements on the shaft or a dynamic imbalance, can advantageously be avoided. At the same time, the method for producing, an angle measurement system or a component of an angle measurement system can be simplified as a result since subsequent time- and cost-intensive affixing of the separately structured element to the shaft of the angle measurement system is not necessary.

In accordance with a further advantageous embodiment, the angle measurement system or the component of the angle measurement system comprises a structural unit having a rotatable shaft on which at least one first and one second element can be arranged which are formed to be rotatable with respect to each other, wherein the first element is arranged for co-rotation with the unit and the second element is arranged for co-rotation with the shaft to which the structure is applied in the arranged state.

It is particularly preferred if the following steps are performed:
1. attaching the first element to the structural unit for co-rotation therewith and arranging the structural unit in the marking system;
2. affixing a measuring body to the shaft of the structural unit;
3. rotating the shaft and determining a centre of rotation and/or a spatial position of the shaft in relation to a reference point, in particular an origin of the marking system by means of the marking system using the measuring body;
4. removing the measuring body;
5. applying the optically effective structure to the first element;
6. attaching the second element to the shaft for co-rotation therewith;
7. applying the optically effective structure to the second element;
8. removing the structural unit from the marking system.

During steps 2 to 7, the structural unit remains in the marking system. As a result, it can be ensured that the optically effective structures of the first or second element are optimally aligned with respect to each other, and therefore a virtually distortion-free angle determination is permitted or the signal cannot disappear due to dynamic imbalances or mounting imperfections.

Preferably, steps 6 and 7 of the inventive are performed until all the elements to be attached to the structural unit are provided with an optically effective structure.

In accordance with a further advantageous embodiment, the structural unit of the angle measurement system may be connected to a drive unit with a rotatable shaft or is formed as a drive unit with a rotatable shaft, wherein the first element is arranged for co-rotation with the structural unit or the drive unit and the second element is arranged for co-rotation with the shaft. It is particularly advantageous that the angle measurement system can already be fitted with the drive unit during production thereof, whereby additional mounting steps which are encumbered with imperfections can be omitted due to the arrangement of the angle measurement system on a shaft of a drive unit.

A further aspect of the present invention relates to an angle measurement system or a component of an angle measurement system which is produced as described above or which comprises an element with a structure, wherein the structure is applied to the element as described above.

Further advantages and advantageous embodiments are defined in the claims, the description and the drawings.

BRIEF DESCRIPTION OF THE DRAWINGS

The invention shall be described in more detail hereinafter by means of exemplified embodiments illustrated in the figures. The figures are shown by way of example, only, and shall not determine the scope of protection of the application. The scope of protection is defined solely by the attached claims.

The Figures show.

Like elements and elements acting in a functionally identical manner are designated with the same reference signs hereinafter.

DETAILED DESCRIPTION

Figure 1:
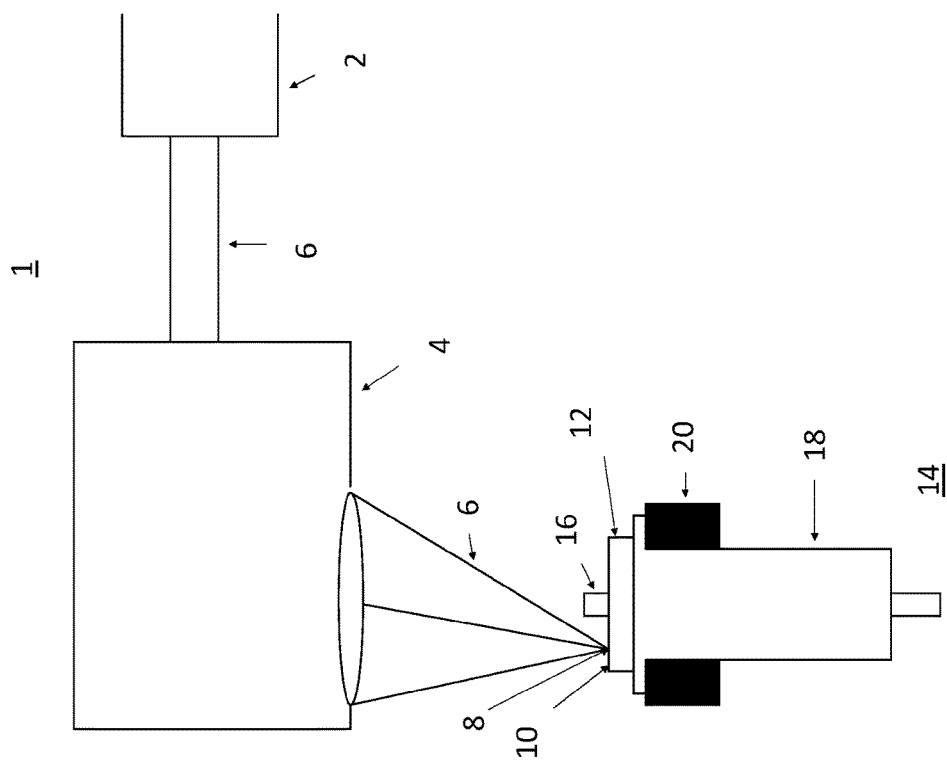
FIG. 1: a schematic illustration of a marking system which operates according to the inventive method, in a first method state.

The method described hereinafter is particularly preferred in particular for producing angle measurement systems but can also be used in general for producing a structure on an element. However, the particular feature in angle measurement systems is that they have to meet high precision requirements with respect to the structures to be applied.

Angle measurement systems are available in a wide variety of designs and modes of construction. They typically contain at least two elements arranged so as to be rotatable with respect to each other and mounted relative to a shaft whose angle of rotation is to be determined. These elements are preferably irradiated by a radiation source, in particular a light source. In order to determine the angle of rotation, one element comprises an optically effective structure as a measuring structure which, in the case of a transmitted light design, has alternating translucent and opaque icons and, in the case of a design operating with reflection, has alternating reflective and non-reflective regions. This measuring structure can be considered in general as an element having a preferably optically effective structure which is arranged relative to a shaft of the angle measurement system.

In addition, the angle measurement system typically comprises, as the other element, a further optically effective reference structure having alternating opaque and translucent or reflective and non-reflective regions. This reference structure can thus likewise be defined as an element having a preferably optically effective structure which is arranged relative to a shaft of the angle measurement system. Grating structures are preferably used as the optically effective structures.

The light emitted from the light source is modulated by the measuring structure and the reference structure depending upon the relative rotation of the structures with respect to each other and then irradiates at at least one suitably connected detector. Depending upon the relative rotation between the measuring structure and the reference structure, different signals are produced which are detected by the detectors and from which in turn it can be determined which position the reference structure and measuring structure have with respect to each other.

Thereby, typically up to four signals are produced in the detectors which have a fixed phase relationship with respect to each other and which, after offset and amplitude compensation, are available for an interpolation of higher resolution and this for a more precise measurement. The detector and one of the optically effective structures, e.g. the reference structure, can also be incorporated on one and the same element, as is known from the prior art, or the detector itself can comprise the corresponding structure, it is further known to combine the detector, the reference structure, the evaluation electronics and the radiation source in a so-called scanning head, whereas the measuring structure is affixed to a part which is movable with respect to the scanning head, wherein the relative position of the part with respect to the scanning head is to be determined.

Irrespective of this, the measuring structure and the reference structure have to be precisely aligned with respect to each other and in relation to the spatial position of the shaft, but preferably in relation to the centre of rotation of the shaft in order to obtain measuring values which are as precise as possible. If this alignment is inadequate, then the angle is detected in a distorted manner and/or the amplitude of the signal is changed and the signal can even almost disappear. In this respect, even minimum alignment imperfections in the magnitude of a few μm may produce undesired signal variations. In order to counteract these alignment problems, it was proposed in the prior art to determine the eccentricity of the measuring structure element and to take this into account when applying the measuring structure element; however, either dynamic imbalances of the shaft itself, to which the measuring structure element is typically attached after production thereof, are neglected, and therefore the measuring structure element is not rotated about the measured centre of rotation after installation thereof, or after its production, the measuring structure element must be calibrated precisely to the shaft during installation, as disclosed in DE 10 2005 021, which requires additional requirements on the features of the measuring structure element and additional requirements on the features of the accommodation of the measuring structure element on the shaft. Furthermore, additional measuring means are required during installation, by means of which the distances requested in DE 10 2005 021 can be determined. Furthermore, the measuring structure element must then be attached to the shaft in compliance with these distances.

Therefore, it is proposed in accordance with the invention not to measure the eccentricity of the element to which the structure is applied but to measure the spatial position Or centre of rotation of the shaft itself, relative to which the element is arranged, and to take this into account when applying the structure. The inventive method is particularly suitable for marking systems which apply the structures to the elements of an angle measurement system by means of a laser.

By way of example, the inventive method is described hereinafter with reference to FIGS. 1 to 3 and with the aid of an angle measurement system, in particular a structural unit 14 of an angle measurement system, wherein the angle measurement system comprises an element 12 connected to the structural unit 14 for co-rotation therewith and supporting the reference structure, and an element 24 connected to a shaft 16 of the structural unit 14 for co-rotation therewith and supporting the structure of the measuring structure. The structures are applied by means of a marking system 1 formed as laser system, wherein the elements 12, 24 are not individually restrained in the marking apparatus 1, as is known from the prior art, but the entire structural unit 14 is restrained.

FIG. 1 schematically shows a marking system 1 having a laser unit 2 and a deflecting unit 4 which concentrates a laser beam 6 and focuses it at a point 8. The focal point 8 is set such that it is formed precisely on a processing plane 10 of an element 12 to be provided with a structure. The element 12 to be provided with the structure, as shown in FIG. 1, is not arranged separately in the marking unit 1, as is known from the prior art, but is arranged on the structural unit 14 of the angle measurement system. The structural unit 14 has a rotatably mounted shaft 16 and a rigid unit 18 which in turn are held on the marking system 1 by holding elements 20. The rotatable shaft 16 can typically be driven by a motor, in particular an electric, motor, or is formed as part thereof, wherein the rotation of the shaft 16 relative to the rigid unit 18 is to be determined by means of the angle measurement system.

In the exemplified embodiment illustrated in this ease, the element 12 to be provided with the structure is connected to the rigid unit 18 for co-rotation therewith and thus forms part of the structural unit 14. Of course, it would also be possible to connect the element 12 to the shaft 16 for co-rotation therewith, instead of to the rigid unit 18.

Instead, of determining the eccentricity of the element 12, 24, as is known from the prior art, the spatial position or centre of rotation of the shaft 16 is determined in accordance with the invention before the element 12, 24 is provided with a structure in dependence upon the determined values.

Figure 2:
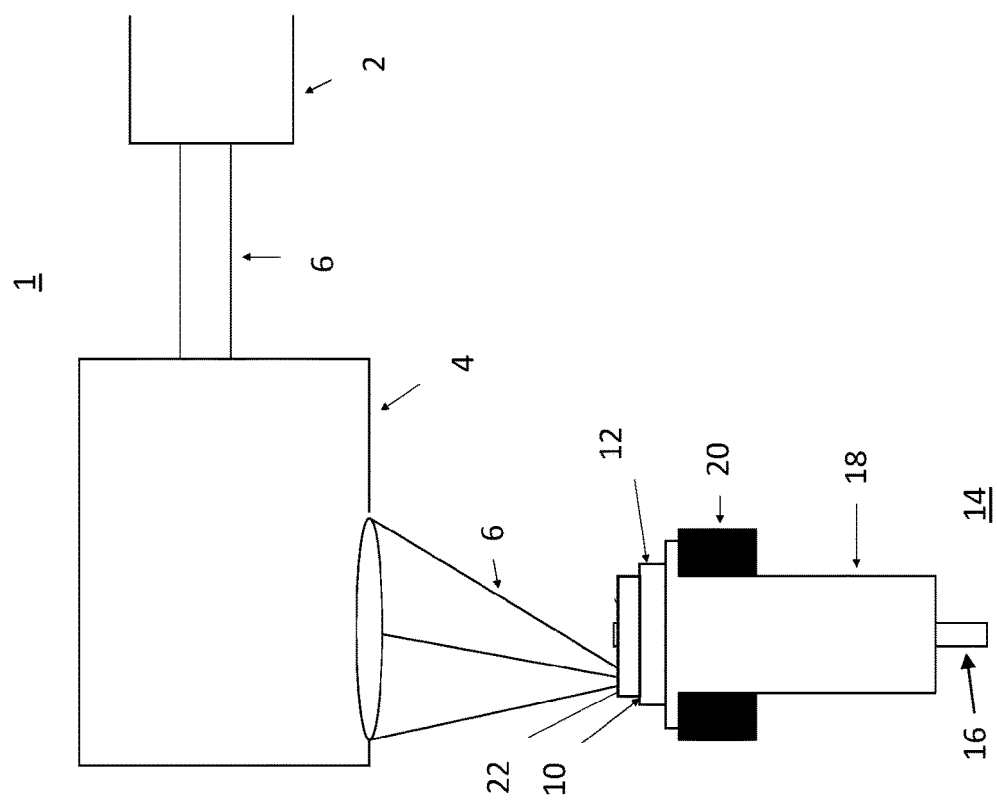
FIG. 2: the marking system illustrated in FIG. 1 in a second method state.

In order to determine the spatial position or centre of rotation of the shaft 16, a measuring body 22 is inventively placed on the shaft 16, as shown in FIG. 2, wherein the measuring body 22 is preferably arranged on the shaft 16 in a form-fitting manner.

The measuring body 22 itself may have different designs. On the one hand, the measuring body 22 may be formed as a sensor which is configured to provide signals which can be used in order to precisely determine (actively) the spatial position of the shaft, but preferably its centre of rotation, and to transmit the measured values to the marking system 1 via a suitable interface. Besides the active measurement, also a passive measuring body 22 may be used which is directly pre-measured, for example, with the marking system 1. Thereby, the measuring body 22 may have either a suitable geometric shape or a prefabricated measuring marking may be applied, to the measuring body 22, which marking is scanned by means of the marking system 1. Alternatively or additionally, a measuring marking may also be applied to the measuring body 22, for example by the marking system 1, and may be measured by means of the measuring system or by means of an external observation device, such as for example a microscope, in order to precisely determine the spatial position of the shaft, but preferably the centre of rotation thereof.

Typically, in order to detect the measuring marking on the measuring body 22, whether it is prefabricated or applied, or even to detect the geometric structure of the measuring body 22, and to determine therefrom the spatial position of the shaft 16, the measuring body 22 is measured in a first position and is then rotated into a second position, preferably by about 180°, by means of the shaft 16, in which the measuring body 22 is re-measured. Alternatively, at least one corresponding measuring marking can also be applied in this case. The obtained result is evaluated in terms of the rotation, e.g. the about 180° angle, and in terms of its offset. The evaluation results are then considered in relation to a preferably predetermined reference point of the laser system, e.g. an origin. As a result, correction values fir the structure, which is to be subsequently applied, are obtained which indicate the actual spatial position or actual centre of rotation of the shaft 16. Accordingly, the structure subsequently applied to the element 12 takes into account, in a simple manner, the precise spatial position, but preferably the precise centre of rotation of the shaft.

This method for determining the spatial position or centre of rotation of the shaft can be repeated in order to verify the result or to achieve further improvement of the centring. It should be mentioned that angles other than about 180° may also be used for determining the relationship between the spatial position of the shaft and the reference point of the laser system.

As the measuring, body, measuring bodies having a measuring marking, which is produced with a high level of precision and demonstrates an refraction behaviour which is different compared with an unmarked location are particularly suitable. In order to determine the spatial position of this measuring, marking, the energy of the laser beam 6 can be adapted such that it is possible to scan the measuring body 22 without causing damage. Thereby, the energy of the laser 2 may be reduced but it is also possible to use an additional pilot laser which is collinearly coupled into the beam path of the marking laser.

If the spatial position of the shaft 16 is determined by means of the measuring body 22, the measuring body 22 is preferably subsequently removed from the shaft 16 and, by means of the marking system 1, the required structure is produced on the element 12, wherein the determined correction values are used.

Alternatively, it is of course also possible to affix the element 12 to the structural u 14, in particular the rigid unit 18, only after determining the spatial position of the shaft 16. The attachment for co-rotation can be effected for example by virtue of the fact that the element 12 is attached to the rigid unit 18 by means of adhesion. However it is likewise possible to use fittings and/or screw connections.

In order to apply the structure itself, the focal point 8 of the laser beam 6 is set to the plane 10 of the element 12, as shown in FIG. 1, and the laser energy of the laser 2 is set such that it is above the marking threshold, i.e. the material structure of the element 12 can be changed.

Figure 3:
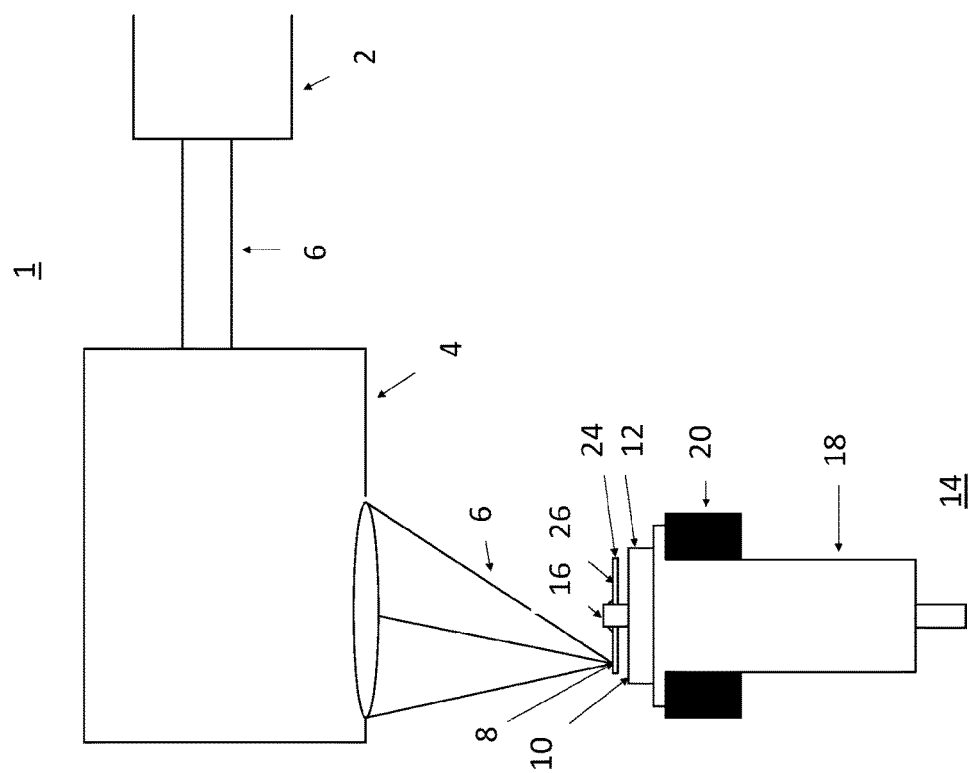
FIG. 3: the marking system illustrated in FIG. 1 and FIG. 2 in a third method state.

If the structural unit 14 comprises not only the element 12 as a structure-supporting element, then after applying the structure to the first element 12 a further element, e.g. the element 24 as shown in FIG. 3, can be arranged on the shaft 16. FIG. 3 illustrates that the element 24 is connected to the shaft 16 for conjoint rotation therewith and therefore is mounted so as to be rotatable with respect to the element 12. The attachment to the shaft can again be effected by means of adhesion, for example.

Since the structural unit 14 has preferably not been removed from the marking unit 1 after applying the structure to the first element 12, the same correction values relating to the spatial position of the shaft 16 can be used for applying the structure to the second element 24 as when applying the structure to the element 12. Imperfections in production can therefore be avoided. Of course, it is also possible to determine the spatial position of the shaft 16 again, as described above. In order to apply the structure to the element 24, the laser beam 6 is again focused at a point 8 such that this coincides with the processing plane 26 of the element 24. In this respect, the deflecting unit 4 can be actuated accordingly.

As can be seen from FIGS. 1 to 3, the inventive method can be used to produce a highly-precise angle measurement system which is extremely robust with respect to unavoidable arrangement imperfections of the reference structure relative to the measure structure element and also with respect to dynamic imbalances of the shaft 16 itself. The reference structure can be considered, for example, as a rotationally fixed element 12 which is connected to the structural unit 14 for co-rotation therewith whilst the measuring structure as the element 16 is connected to the shaft 16 for co-rotation therewith. Since the two elements 12, 24 have been provided with structures with respect to the centre of rotation of the shaft 16, an angle measurement system can be created which permits extremely precise measurements in a simple manner.

In subsequent steps, the structural unit 14 can also be equipped in a manner known per se at least with a radiation source, a detector and/or evaluation electronics in order to provide a fully-functioning angle measurement system.

LIST OF REFERENCE NUMERALS

1 Marking system
2 Radiation source=laser
4 Deflecting unit
6 Laser beam
8 Focal point
10, 26 Processing plane
12 First element
14 structural unit
16 Shaft
18 Rigid unit
20 Holder
22 Measuring body
24 Second element

The invention claimed is:

1. Method for applying a structure to at least one element with a marking system, wherein the at least one element is arranged relative to a shaft, the method comprising:
   a) arranging the shaft or the shaft with the element arranged relative to the shaft in the marking system;
   b) determining a centre of rotation of the shaft in relation to a reference point of the marking system; and
   c) applying a structure to the element,
   wherein the structure is applied taking into account the determination of the centre of rotation of the shaft, and wherein between step a) and b) a form-fitting measuring body is placed on the shaft, by means of which the relation of the centre of rotation of the shaft to the reference point of the making system is determined.

2. Method according to claim 1, wherein the shaft or the shaft with the element arranged relative to the shaft is left in the marking system during all the steps following step a).

3. Method according to claim 1, wherein the centre of rotation of the shaft is determined by means of a measuring body which is formed as an active measuring body.

4. Method according to claim 1, wherein centre of rotation of the shaft is determined by means of a measuring body which can be formed as a passive measuring body, wherein the determination of the centre of rotation of the shaft is provided via a geometric design of the measuring body and/or via a measuring marking formed on the measuring body.

5. Method according to claim 4, wherein the measuring marking is applied to the measuring body at least partially as a prefabricated measuring marking.

6. Method according to claim 4, wherein the measuring marking is applied to the measuring body at least partially during the step of determining the centre of rotation of the shaft.

7. Method according to claim 4, wherein the marking system comprises at least one radiation source at least for determining the centre of rotation of the shaft, wherein the measuring marking, upon irradiation with the radiation source has at least one structured region a different reflection behaviour compared to an unstructured region.

8. Method according to claim 1, wherein the measuring body is removed from the shaft prior to applying the structure to the at least one element.

9. Method according to claim 1, wherein the shaft is rotated in order to determine the centre of rotation thereof.

10. Method according to claim 1, wherein for the step of determining the centre of rotation of the shaft a energy density of the marking system is lower than for the step of applying the structure.

11. Method according to claim 1, further comprising the step of attaching the element to the shaft or to a device including the shaft, wherein the step of attaching the element is performed before step a) or before step c).

12. Method according to claim 11, comprising applying the structure to a further element arranged relative to the shaft and, for the application of the structure to the further element to be arranged relative to the shaft, performing only the attaching step and the step of applying the structure.

13. Method according to claim 1, wherein after applying the structures to all the elements to be arranged relative to the shaft, the shaft with the at least one element arranged relative to the shaft is removed from the marking system.

14. Method for producing air angle measurement system or a component of an angle measurement system, wherein the angle measurement system or component comprises at least one element having an optically effective structure, wherein the structure is applied to the element in accordance with a method as claimed in claim 1.

15. Method according to claim 14, wherein the angle measurement system or component comprises a structural unit having a rotatable shaft on which at least one first and one second element are arranged which are formed to be rotatable with respect to each other, wherein the first element is arranged for co-rotation with the structural unit and the second element is arranged for co-rotation with the shaft to which the structure is applied in the arranged state.

16. Method according to claim 14, wherein in order to produce the angle measurement system or component the following steps are performed:
 i. attaching the first element to a structural unit for co-rotation therewith and arranging the structural unit in the marking system;
 ii. affixing a measuring body to the shaft of the structural unit;
 iii. rotating the shaft and determining a centre of rotation of the shaft in relation to a reference point, by means of the marking system using the measuring body;
 iv. removing the measuring body;
 v. applying the optically effective structure to the first element;
 vi. attaching the second element to the shaft for co-rotation therewith;
 vii. applying the optically effective structure to the second element;
 viii. removing the structural unit from the marking system,
wherein, during steps ii. to vii., the structural unit remains in the marking system.

17. Method according to claim 16, wherein the structural unit is formed as a drive unit having a rotatable shaft or can be connected to a drive unit having a rotatable shaft.

18. Method according to claim 16, wherein steps vi. and vii. are performed until an optically effective structure is applied to all the elements to be attached to the structural unit.

19. Angle measurement system or component of an angle measurement system which comprises at least one element having a structure, wherein the structure is applied in accordance with a method as claimed in claim 1.

* * * * *